United States Patent [19]

Mink et al.

[11] 4,364,853

[45] Dec. 21, 1982

[54] CATALYST FOR POLYMERIZING OLEFINS

[75] Inventors: Robert I. Mink; Ronald A. Epstein, both of Yonkers, N.Y.

[73] Assignee: Stauffer Chemical Company, Wesport, Conn.

[21] Appl. No.: 303,329

[22] Filed: Sep. 18, 1981

[51] Int. Cl.$^3$ ............................................. C08F 4/64
[52] U.S. Cl. ............................... 252/429 B; 526/125; 526/114
[58] Field of Search ..................................... 252/429 B

[56] References Cited

U.S. PATENT DOCUMENTS

| | | | |
|---|---|---|---|
| 3,549,717 | 12/1970 | Itakura et al. | 252/429 B X |
| 4,013,823 | 3/1977 | Longi et al. | 252/429 B X |
| 4,069,169 | 1/1978 | Toyoda et al. | 252/429 B |
| 4,186,107 | 1/1980 | Wagner | 252/429 B |
| 4,222,894 | 9/1980 | Takahashi et al. | 252/429 B |
| 4,277,372 | 7/1981 | Matlack | 252/429 B |
| 4,294,948 | 10/1981 | Toyota et al. | 252/429 B X |

*Primary Examiner*—Patrick Garvin

*Attorney, Agent, or Firm*—Henry Z. Friedlander

[57] ABSTRACT

A catalytic system for polymerizing olefins comprises:
(a) a component containing an organoaluminum compound, and
(b) a component containiong a titanium halide prepared by a process comprising:
  (i) intimately contacting a magnesium compound containing halogen or a manganese compound containing halogen with a carboxylic acid to produce an activated product,
  (ii) optionally treating the activated product with a phenol, and
  (iii) reacting the activated product, optionally treated with phenol, with a titanium halide compound.

The invention also includes a process for preparing component (b) containing a titanium halide, the composition of component (b), and the use of the catalytic system for polymerizing olefins such as ethylene or propylene.

30 Claims, No Drawings

CATALYST FOR POLYMERIZING OLEFINS

BACKGROUND OF THE INVENTION

This invention relates to a catalytic system for polymerizing olefins, a novel component of the system containing titanium halide, a process for preparing the novel component containing titanium halide, and the use of the system in polymerizing olefins, especially propylene.

The polymerization of olefins by coordinate complex catalytic systems, often termed Ziegler-Natta catalysis, has been well-known for over 25 years. Generally, there are two components in this type of system: the catalyst containing a titanium or other transition metal halide, and the cocatalyst based on an organoaluminum compound or its substitute. The cocatalyst may be accompanied by an electron donor. Although thousands of such catalytic systems have been disclosed, there is always a quest for improvement in two important properties: activity and isotatic index.

Activity is measured by the grams of polyolefin produced per gram of titanium component or other transition metal component employed in the catalytic system. The higher the activity, the lower the amount of metallic ash and corrosive halide left in the polymer. If the activity is high enough, then the de-ashing step in processing the final polyolefin can be omitted - an important improvement.

For olefins, such as propylene, which can form isotactic structures, the higher the isotactic index, the better the physical properties of the polymer. Isotactic polypropylene is more ordered, less soluble in halocarbons or hydrocarbons, and useful for its higher strength than the more soluble atactic form. Isotactic indices of 90 or higher are favored for commercial polypropylene.

In British Pat. No. 1,577,301 granted to Toyota et al. a process is disclosed for polymerizing olefins with a catalyst component obtained by copulverizing a magnesium halide, Mg alkyl halide, Mg alkoxyhalide, or Mg phenoxyhalide with a carboxylic ester (optionally halogenated) and then mixing the activated product with aliphatic or alicyclic alcohols or a phenol, such as cresol, at room temperature.

Japanese Pat. No. 72/6,408 granted Feb. 23, 1972 to Yamazaki et al. (C.A. 77:49175 g) discloses a polymerization catalyst of titanium trichloride and the reaction products of a trialkylaluminum with adipic acid, benzoic acid, or stearic acid.

U.S. Pat. No. 4,143,223 granted to Toyota et al. discloses a catalytic component obtained by copulverizing a magnesium halide with an organic ester and an active-hydrogen compound, which may be an alcohol or a phenol, and reacting this activated product with a liquid tetravalent titanium halide or alkoxide.

U.S. Pat. No. 4,220,745 granted to Tanaka et al. discloses preparation of a catalytic component by copulverizing magnesium halides and aromatic carboxylic orthoesters with titanium halides.

U.S. Pat. No. 4,082,692 granted to Goldie discloses a fluidized bed of a magnesium compound supporting a titanium catalyst which has been post-treated with an alcohol or phenol.

U.S. Pat. No. 3,642,746 granted to Kashiwa et al. discloses a process for preparing a transition metal catalyst supported on a divalent halide which has been activated by an electron donor and treated by a liquid or gaseous titanium or vanadium compound.

It is an object of this invention to provide a catalytic system for polymerizing olefins, such as propylene, so that de-ashing may be omitted and polymer with high isotactic index prepared. Other objects of the present invention will be apparent to those skilled in the art.

SUMMARY OF THE INVENTION

Surprisingly, both a high activity and high isotactic index (II) can be achieved by employing the novel catalyst of the present invention for the polymerization of olefins, particularly propylene. The novel catalytic system comprises:

(a) a component containing an organoaluminum compound, and (b) a component containing a titanium halide obtained by a process comprising:

(i) intimately contacting a magnesium compound containing halogen or a manganese compound containing halogen with a carboxylic acid to produce an activated product, (ii) optionally treating the activated product with a phenol, and (iii) reacting the activated product, optionally treated with a phenol, with a titanium halide compound.

For another aspect of the present invention the novel component containing a titanium halide and a process for producing the novel component containing a titanium halide are provided.

For still another aspect of the present invention a process for employing the novel catalytic system to polymerize olefins such as propylene and ethylene is provided.

DETAILED DESCRIPTION OF THE INVENTION

The present invention is broadly applicable to the polymerization of olefinic monomers especially 1-olefins including ethylene, dienes especially conjugated ones such as butadiene, and those other olefins which are only marginally polymerizable, such as 2-butene. The preferred monomeric olefins are those corresponding to the formula $R-CH=CH_2$, wherein R is an alkyl radical containing up to 12 carbon atoms inclusive and hydrogen. Among the preferred, olefinic monomers are ethylene, propylene, 1-butene, 1, 3-butadiene, 1-pentene, 4-methyl-1 pentene, 1-hexene, and the like. These monomers may be employed individually or in comonomeric mixtures such as ethylene/propylene, ethylene/propylene/butadiene, and the like.

Although for illustrating the present invention the polymerization of propylene is described herein as an example, the invention is by no means limited to any one olefin.

Component (a) containing an organoaluminum compound is well-known to those skilled in the art of coordinate complex (Ziegler-Natta) addition polymerization. Component (a) may be selected from the following compounds: trialkyl aluminums such as triethylaluminum, triisobutylaluminum, and trihexylaluminum, dialkyl aluminum halides such as diethylaluminum chloride, diethylaluminum bromide, and dibutylaluminum chloride, alkylaluminum sesquihalides such as ethylaluminum sesquichloride, alkylaluminum dihalides such as ethylaluminum dichloride, ethylaluminum difluoride, and butylaluminum dichloride, and dialkylaluminum alkoxides such as diethylaluminum ethoxide, diethylaluminum butoxide, and diethylaluminum phenoxide.

An electron donor such as an alkyl ester of an aromatic acid may be used in conjunction with component (a). Methyl toluate and ethyl anisate are examples of such electron donors. Electron donors in component (a) are advantageously used in molar ratio from about 1:10 to 1:1 with respect to the aluminum alkyl.

The first step (i) in obtaining component (b) containing a titanium halide is intimately contacting a magnesium or a manganese compound or a mixture thereof containing halogen as a support with an electron donor activating agent, most preferably a carboxylic acid.

By "intimately contacting" any process at the molecular or working particle level of matter is intended rather than mere mixing of diverse materials or phases. The preferred method of intimately contacting is by copulverization. Copulverization may be carried out in any suitable milling equipment such as a ball mill, a hammer mill, a vibratory mill, a grinding mill, or the like. Use of a ball mill is preferred, especially employing stainless steel balls, but ceramic, glass, or balls of other material may be substituted.

Copulverization may be carried out in the presence of an organic or inorganic pulverization aid which may be a simple compound or a polymer. Representative pulverization aids are kerosene, polystyrene, polypropylene, organosiloxanes, boron oxide, silicon oxide and aluminum oxides. Of the cited pulverization aids the polysiloxanes, which also have electron-donating properties, are preferred. From about 0.001 to about equal weight of such pulverization aid compared to the support material may be used.

The preferred support for practicing the instant invention is anhydrous magnesium dichloride, but other support materials may be selected from magnesium hydroxychloride, magnesium alkoxychloride, magnesium bromide, magnesium hydroxybromide, magnesium alkoxybromide; manganese chloride, manganese bromide, manganese hydroxychloride, manganese hydroxybromide, and manganese alkoxyhalide. Magnesium phenoxy halides and magnesium substituted phenoxy halides may also be used. Preferred substituents in the phenoxy moiety are alkyl groups containing 1 to 5 carbon atoms, halogen groups such as chlorine or bromine, and the nitro group. As in chlor-substituted phenoxy magnesium compounds, the magnesium or manganese compound containing halogen need not have the halogen atom directly bonded to the magnesium or manganese atom.

The support, chosen from the halogenated materials cited above, may also be partially converted to alcoholate groups. Furthermore, the support may contain diluents, up to about 70 percent, of inert, powdered material such as inorganic carbonates, sulfates, borates, or oxides. Examples of such diluents are dry NaCl, KCl, LiCl, CaCO$_3$, BaCO$_3$, Na$_2$SO$_4$, K$_2$SO$_4$, Na$_2$CO$_3$, K$_2$CO$_3$, Na$_2$B$_4$O$_7$, CaSO$_4$, B$_2$O$_3$, Al$_2$O$_3$, SiO$_2$, TiO$_2$, and the like.

In the present invention the activating agent is a carboxylic acid electron donor. This carboxylic acid may be chosen from any hydrocarbyl acid defined as aliphatic carboxylic acids, alicyclic carboxylic acids, or aromatic carboxylic acids containing hydrogen and carbon. Acids with non-interfering substituents such as halogen, alkoxyl, or nitro moieties may also be employed. The preferred electron donor carboxylic acids are aromatic carboxylic acids having 7 to 15 carbon atoms. Highly preferred carboxylic acids are benzoic acid and the toluic acids.

The carboxylic acid may be placed in the apparatus for intimate contacting before, during, or after some of the pulverizing time, as long as the support material and the carboxylic acid are intimately contacted during some of the pulverization. The preferred amount of carboxylic acid ranges from about 0.01 to about 1 mole per mole of support material.

The intimate contact or pulverizing step (i) of the present invention may be carried out for from about 1 hour to about 10 days. A time of from about 2 to about 5 days is preferred for step (i).

The second step (ii) of the present invention is optional.

It is treatment of the activated support material with a phenolic compound such as phenol itself or a cresol in a solvent preferably at an elevated temperature.

Treatment with a phenol can take place at any temperature between about 0° and about 200° C., but a treatment temperature between about 50° and 100° C. is preferred. Depending on the temperature of treatment, the treatment time can vary from a few minutes to a day or more with shorter treatment times being more appropriate with higher treatment temperatures. The preferred time is from about one-half to four hours. Especially preferred is a treatment time from one to three hours at about 50° to about 60° C. Normally a molar excess of phenol compared to the support is employed in an inert hydrocarbon diluent such as heptane.

Phenolic compounds which may be employed for the optional treatment step (ii) are phenols and naphthols which have at most 20 carbon atoms and their derivatives substituted with at most four alkyl moieties, alkoxy moieties, or halogen atoms. Typical examples of such phenols and/or naphthols which may be employed to treat the activated support material are phenol, itself C$_6$H$_5$OH, p-cresol, m-cresol, o-cresol, anisole, tert-butyl phenol, 2,6-dimethyl phenol, other xylenols, β-naphthol, α-naphthol, picric acid, octyl phenols, nonyl phenols, and cumyl phenol. Any of these phenols or naphthols may be used individually or in mixtures with each other. The preferred phenolic compounds are phenol, itself, and p-cresol.

After optional treatment with a phenol the support material is normally filtered, washed with a volatile hydrocarbon solvent such as heptane, and vacuum dried. No one or all of these three steps is necessary, however, for carrying out the process of this invention. If convenient, separation, washing, and drying is preferred.

The third step (iii) in the process of this invention is reaction with a titanium compound in order to prepare the titanium component of the heterogeneous complex polymerization catalyst.

The titanium compound employed for the reactive step may be represented by the formula:

Ti X$_n$(OR')$_p$(NR$^2$R$^3$)$_q$(OCOR$^4$)$_r$ wherein X is a chlorine, bromine, or iodine atom; R', R$^2$, R$^3$, and R$^4$ may be the same or different and are hydrocarbyl radicals having from 1 to about 12 carbon atoms; n is a number from 1 to 4; p, q, and r are numbers from 0 to 3, and n+p+q+r is 3 or 4.

Some examples of titanium halocompounds useful in performing the reactive step are titanium tetrachloride, titanium tetrabromide, titanium tetraiodide, methoxytitanium trichloride, dimethoxytitanium dichloride, ethoxytitanium trichloride, dimethylaminotitanium trichloride, bis (dimethylamino) titanium dichloride and titanium benzoate trichloride. Preferably the reactive titanium compound is a liquid, but this is not necessary if a convenient, inert solvent can be found for the reagent. The titanium compound can be employed neat or in a suitable solvent. The ratio of titanium compound to magnesium support material can range from about 0.1 to about 100 molar.

Titanium trichloride material may also be used.

The titanium reaction can be carried out at any temperature from about 25° to about 200° C., but temperatures from about 75° to about 150° C. are preferred. This reaction can be carried out for from a few minutes to several hours, but a reaction time of one-half to four hours is preferred.

After the pulverization, optional phenol-treating, and titanium-reaction steps, the product is preferably separated from the liquid medium, washed with an inert solvent such as heptane, and dried, preferably by vacuum drying at ambient temperature. Because this supported titanium catalyst component is sensitive to air and moisture it should be stored in a dry, inert atmosphere.

The titanium catalyst component which is a product of the process of the present invention may be used along with a suitable organoaluminum compound as a catalyst for the polymerization of olefins such as ethylene, propylene, butene and butadiene, or copolymers of these olefins with each other and other olefins, in the heterogeneous complex (Ziegler-Natta) type of polymerization in conventional fashion, as is well-known. This polymerization is illustrated in the Examples. The molar ratio of organoaluminum compound to titanium in the treated and modified titanium component of the present invention may range from about 2000:1 to about 0.5:1; the preferred molar ratio is from about 200:1 to about 100:1. Electron donors such as aromatic carboxylic esters may be employed in conjunction with the organoaluminum compound at a molar ratio of from about 1:1 to about 1:10 ester to organoaluminum compound.

Having described the present invention above, we now illustrate it in the following Examples. These Examples, however, do not limit the present invention, which may be carried out by other means but still remain within the scope of the present disclosure.

EXAMPLE 1

This Example illustrates the present invention including the optional step of treating the catalytic component with phenol.

A 1-1 ball mill was charged with anhydrous $MgCl_2$ (30 g, 315 mmol), benzoic acid (0.8 g, 6.6 mmol), silicone oil (4.5 ml, General Electric Co. SF 96-100), and 1750 grams of stainless steel balls (diameter of 1.6 cm) and milled for 162 hours. To an aliquot (10 g) of this milled product suspended in 200 ml of heptane was added phenol (7.4 g, 78.7 mmol). The mixture was stirred at 55° C. for two hours and then filtered. The precipitate was washed with heptane (800 ml), dried under vacuum and sieved through a standard 140-mesh screen. The screened product (5.4 g) was then reacted with neat $TiCl_4$ (90 ml, 818 mmol) at 105° C. for two hours. After filtration at ambient temperature, the precipitate was washed with heptane (800 ml), dried under vacuum, and sieved through a standard 140-mesh screen to yield 4.3 g of titanium catalyst component.

EXAMPLE 2

This Example illustrates standard test conditions for slurry polymerization, one of the techniques for utilizing the present invention.

A polymerization reactor in the form of a four-liter, jacketed autoclave was equipped with a heater, purging ports, thermocouple, and mechanical stirrer. It was charged with two liters of dry heptane and brought to $50 \pm 5°$ C. A nitrogen purge was commenced, and a weighed quantity of the organoaluminum compound was added by syringe and stirred for about 10 seconds. Then a weighed amount of the electron donor was added through the entry port, and the reaction mixture stirred for about 10 seconds again. At this point the solid titanium component of the catalyst system, as made in Example 1, was added. Polymer-grade propylene was then pumped into the reactor until a pressure of 10 atmospheres was reached at 65° C. During the polymerization more propylene was added to maintain the pressure at 10 atmospheres at 65° C. for $1\frac{1}{2}$ hours, the duration of the standard test.

After the $1\frac{1}{2}$ hour standard test the polymer was filtered, washed with isopropyl alcohol, over-dried at 70° C., and weighed, thus giving a weight termed Dry Polymer. In order to determine the amount of heptane-soluble polymer formed the reaction solvent filtrate was evaporated to dryness.

EXAMPLE 3

This Example illustrates standard test conditions for bulk polymerization, another technique for utilizing the present invention.

As in Example 2, a 2.8 l. jacketed autoclave was equipped with a heater, purging ports, thermocouple, and mechanical stirrer. The nitrogen purge, addition of organoaluminum compound, electron donor, and titanium component of the present invention was carried out as in Example 2. Then 2 l. of liquid propylene was added and brought to 70° C. Again the standard polymerization test was run for $1\frac{1}{2}$ hours. At the end of the polymerization time excess propylene was vented from the reactor. The polymer was collected, dried at 70° C., and weighed to give the amount of Dry Polymer.

For both the slurry test of Example 2 and the bulk polymerization of Example 3, the activity of the titanium component of the present invention was defined as follows:

$$\text{Activity} \left( \frac{\text{g polymer}}{\text{g catalyst component}} \right) = \frac{\text{Dry Polymer (g) plus Heptane – Soluble Polymer (g)}}{\text{Titanium Component (g)}}$$

The amount of polymer insoluble in heptane was determined by a three-hour extraction at the boiling point of heptane and termed "$C_7$". Isotactic Index (II) was then defined as:

$$II = \frac{\text{"}C_7\text{"} \times \text{Dry Polymer (g)}}{\text{Total Polymer Produced (g)}} \times 100$$

This standard bulk polymerization was carried out as above employing 33.0 mg of the novel titanium component prepared as in Example 1 as catalyst and triethylaluminum/methyl p-toluate in the ratio of 9 mmol:3 mmol as cocatalyst. After separation, drying, and weighing, the activity was found to be 9256 (g/g) and the II 88.0.

EXAMPLES 4-10

These Examples illustrate the present invention for several carboxylic acids as activating agents without employing the optional treating step with a phenolic compound.

The same equipment and procedure as in Example 1 was employed individually for each of the carboxylic acids listed below. Anhydrous $MgCl_2$ (30 g, 315 mmol), the carboxylic acid (0.8–1.5 g), and silicone oil (4.5 ml) were milled for 4 to 5 days in a 1-1 ball mill with 1750 g of 1.6-cm diameter stainless steel balls. A 5-g aliquot of each activated product was then treated with 75 ml (682 mmol) of neat $TiCl_4$ for 1.5 hours at 100° C. The reaction mixture was then filtered. The precipitate was washed with 800 ml heptane, vacuum-dried overnight, and sieved through a standard 140-mesh screen.

The standard slurry polymerization was carried out as in Example 2 employing 50 mg of titanium component as catalyst and using triethylaluminum and methyl p-toluate in the ratio of 12:3 mmol as the cocatalyst. The following results for activity and II for each of the designated Examples were found:

| Example | Carboxylic Acid | g Acid/ 30g $MgCl_2$ | Activity/II |
|---|---|---|---|
| 1 | Benzoic | 0.8 | 6779/88.4 |
| 4 | Benzoic | 1.5 | 7324/83.6 |
| 5 | Benzoic | 0.8 | 5423/89.1 |
| 6 | Phthalic | 1.5 | 4010/84.4 |
| 7 | o-Toluic | 0.9 | 6165/87.6 |
| 8 | m-Toluic | 0.9 | 5021/86.1 |
| 9 | p-Toluic | 0.9 | 4867/87.9 |
| 10 | m-Phenoxybenzoic | 0.9 | 3913/87.6 |

We claim:

1. A catalytic system for polymerizing olefins comprising:
   (a) a component containing an organoaluminum compound, and
   (b) a component containing a titanium halide obtained by a process comprising:
      (i) intimately contacting a magnesium compound containing halogen or a manganese compound containing halogen with a carboxylic acid to produce an activated product, and
      (ii) reacting the activated product with a titanium halide compound.

2. The catalytic system of claim 1 wherein the activated product is treated with phenol before being reacted with the titanium halide compound.

3. The catalytic system of claim 2 wherein the phenol is phenol, itself, $C_6H_5OH$.

4. The catalytic system of claim 1 wherein the carboxylic acid is an aromatic acid containing from 7 to 15 carbon atoms.

5. The catalytic system of claim 1 wherein the titanium halide compound is titanium tetrachloride.

6. The catalytic system of claim 1 wherein the magnesium compound containing halogen or the manganese compound containing halogen is intimately contacted with a carboxylic acid by means of copulverization.

7. The catalytic system of claim 6 wherein the copulverization step (i) is carried out in the presence of a pulverization aid.

8. The catalytic system of claim 7 wherein the pulverization aid is selected from the group consisting of hexane, heptane, kerosene, polystyrene, polypropylene, boron oxide, silicon oxide, and organosiloxanes.

9. The catalytic system of claim 1 wherein the magnesium compound containing halogen is magnesium chloride.

10. The catalytic system of claim 1 wherein the quantity of titanium in the component containing a titanium halide is from about 0.1 percent to about 12 percent by weight expressed as elemental titanium.

11. A component containing titanium halide of a catalytic system for polymerizing olefins prepared by a process comprising:
   (i) intimately contacting a magnesium compound containing halogen or a manganese compound containing halogen with a carboxylic acid to produce an activated product, and
   (ii) reacting the activated product with a titanium halide compound.

12. The component of claim 11 wherein the activated product is treated with a phenol before being reacted wth the titanium halide compound.

13. The component of claim 12 wherein the phenol is phenol, itself, $C_6H_5OH$.

14. The component of claim 11 wherein the carboxylic acid is an aromatic acid containing from 7 to 15 carbon atoms.

15. The component of claim 11 wherein the titanium halide compound is titanium tetrachloride.

16. The component of claim 11 wherein the magnesium compound containing halogen or the manganese compound containing halogen is intimately contacted with a carboxylic acid by means of copulverization.

17. The component of claim 16 wherein the copulverization is carried out in the presence of a pulverization aid.

18. The component of claim 17 wherein the pulverization aid is selected from the group consisting of hexane, heptane, kerosene, polystyrene, polypropylene, boron oxide, silicon oxide and organosiloxanes.

19. The component of claim 11 wherein the magnesium compound containing halogen is magnesium chloride.

20. The component of claim 11 wherein the quantity of titanium in the component containing a titanium halide is from about 0.1 percent to about 12 percent by weight expressed as elemental titanium.

21. A process for producing a component containing titanium halide of a catalytic system for polymerizing olefins comprising:
   (a) intimately contacting a magnesium compound containing halogen or a manganese compound containing halogen with a carboxylic acid to produce an activated product, and
   (b) reacting the activated product with a titanium halide compound.

22. The process of claim 21 wherein the activated product is treated with a phenol before being reacted with the titanium halide compound.

23. The process of claim 22 wherein the phenol is phenol, itself, $C_6H_5OH$.

24. The process of claim 21 wherein the carboxylic acid is an aromatic acid containing from 7 to 15 carbon atoms.

25. The process of claim 21 wherein the titanium halide compound is titanium tetrachloride.

26. The process of claim 21 wherein the magnesium compound containing halogen or the manganese compound containing halogen is intimately contacted with a carboxylic acid by means of copulverization.

27. The process of claim 26 wherein the copulverization step (i) is carried out in the presence of a pulverization aid.

28. The process of claim 27 wherein the pulverization aid is selected from the group consisting of hexane, heptane, kerosene, polystyrene, polypropylene, boron oxide, silicon oxide, and organosiloxanes.

29. The process of claim 21 wherein the magnesium compound containing halogen is magnesium chloride.

30. The process of claim 21 wherein the quantity of titanium in the component containing a titanium halide is from about 0.1 percent to about 12 percent by weight expressed as elemental titanium.

* * * * *